UNITED STATES PATENT OFFICE.

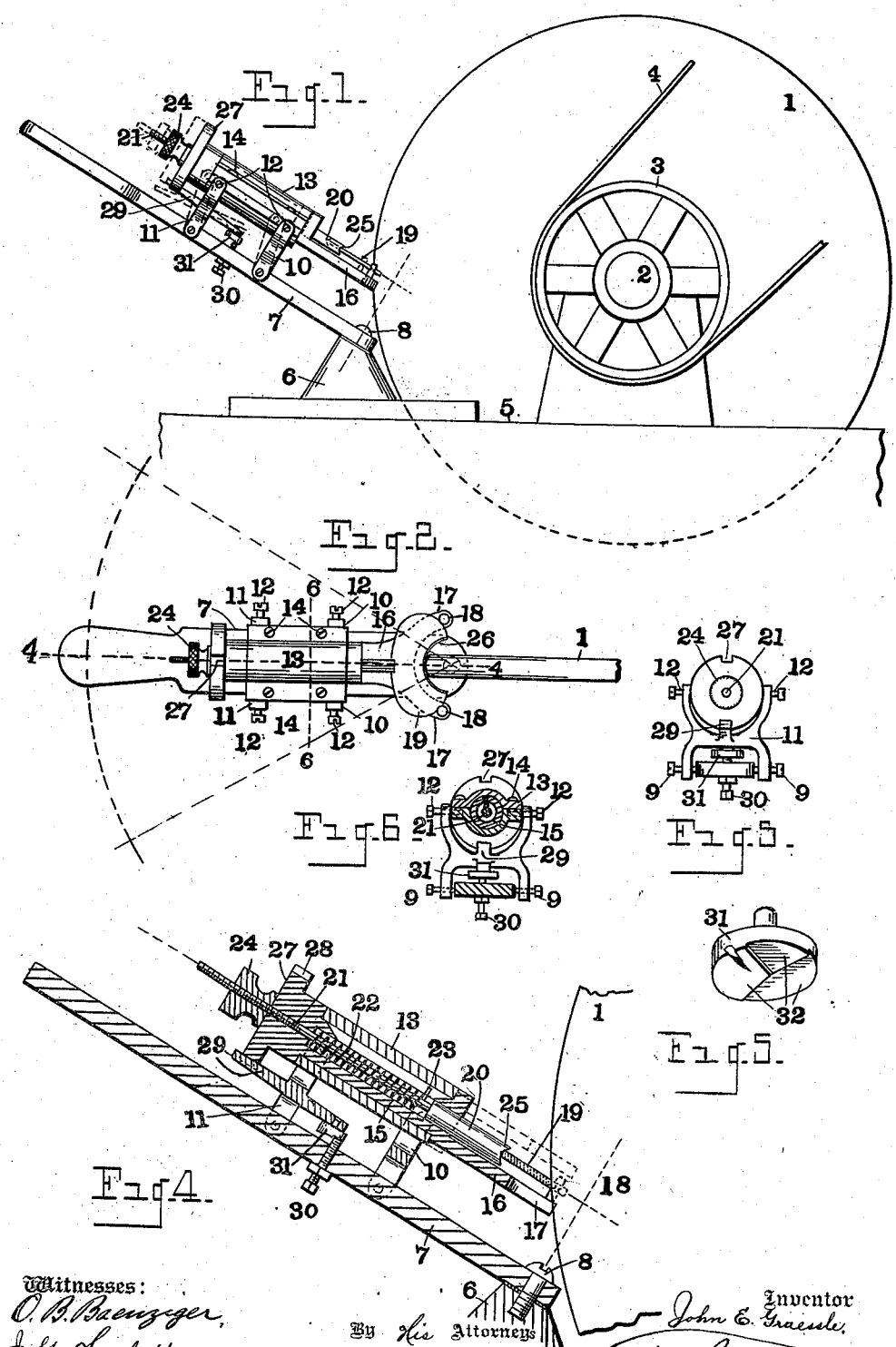

JOHN E. GRAESSLE, OF DETROIT, MICHIGAN.

BIFOCAL-LENS GRINDER.

No. 853,970.

Specification of Letters Patent.

Patented May 21, 1907.

Application filed June 26, 1905. Serial No. 266,974.

*To all whom it may concern:*

Be it known that I, JOHN E. GRAESSLE, a citizen of the United States, residing at Detroit, in the county of Wayne, State of Michigan, have invented certain new and useful Improvements in Bifocal-Lens Grinders; and I do declare the following to be a full, clear, and exact description of the invention, such as will enable others skilled in the art to which it appertains to make and use the same, reference being had to the accompanying drawings, and to the figures of reference marked thereon, which form a part of this specification.

This invention relates to new and useful improvements in machines for grinding the bevel on bifocal lenses, for the purpose of preparing one lens for the fitting of the other lens thereon, and consists in the construction and arrangement of parts hereinafter fully set forth and pointed out particularly in the claims.

The object of the invention is to produce a machine for the purpose stated, wherein the arrangement is such as to enable the grinding of the bevel upon both sides of the lens from one side of the stone or grinding wheel; at the same time enabling both bevels to be ground exactly alike and in the arc of a perfect circle.

The above object is attained by the mechanism illustrated in the accompanying drawing, in which:—

Figure 1 is an elevation of a machine involving my invention. Fig. 2 is a plan view thereof. Fig. 3 is a detail in end elevation of the pivotally mounted supporting sleeve and the reversible lens holder mounted thereon. Fig. 4 is a longitudinal section as on line 4—4 of Fig. 2, a segment of the grinding wheel appearing in elevation. Fig. 5 is a perspective view of a regulating disk, the purpose of which will be hereinafter explained. Fig. 6 is a transverse section as on line 6—6 of Fig. 2.

Referring to the characters of reference, 1 designates the grinding wheel of suitable composition, mounted upon a shaft 2 carrying the belt pulley 3 driven from any suitable source of power through the medium of the belt 4.

Upon the table or bed 5 of the machine is mounted a support 6 in the form of a cone truncated upon a line obliquely to the axis thereof, forming an inclined bearing face to which the forward end of the carriage 7 is pivoted by means of the bolt 8; causing the free end of said carriage to extend upwardly and rearwardly at an incline. This arrangement enables the free end of the carriage to swing in the arc of a circle concentric with the pivot bolt 8, as shown by dotted lines in Fig. 2.

Pivotally attached to the opposite edges of the carriage 7 by means of the set screws 9 which pass through the lower ends thereof, are the bifurcated links 10 and 11 which stand parallel to each other and whose upper ends are pivoted at 12 to the opposite sides of the two-part sleeve 13, formed of semi-cylindrical upper and lower halves united by the screw bolts 14 which pass through the margins thereof, whereby said sleeve becomes mounted upon the carriage 7 to swing longitudinally in the arc of a circle but is always maintained parallel with said carriage.

Journaled to rotate within the sleeve 13 is a hollow shaft 15 having an extended table 16 at its lower end provided with the outwardly curved branches 17 carrying at their ends the stop pins 18 against which the ends of the lens 19 are adapted to bear. To complete the lens holder of which the extended table 16 with its stop pins 18 are a part, there is employed a longitudinally movable plunger 20 seated in the lower end of the hollow shaft 15 and having extending from the upper end thereof a rod 21 surrounded for a portion of its length by a coiled spring 22 confined between a pin 23 projecting from said rod near its lower end and the upper terminal of the larger bore in said shaft in which said spring is located. The extreme upper end of the rod 22 passes through the upper end of said shaft and is threaded to receive the knurled adjusting nut 24, whereby the tension of the spring 22 may be regulated, said nut also serving as a means for drawing the rod and plunger upwardly for the purpose of placing a lens in the holder or removing it therefrom.

It will be noted that the tension of the spring 22 is normally exerted to force the plunger 20 downwardly against the lens which is firmly held between said plunger on the one side and the stop pins 18 on the other side, the lower end of the plunger being notched, as shown at 25, to embrace the edge of the lens. By this arrangement the lens is firmly held in place and may be presented to the face of the grinding wheel so as to grind the desired bevel on the margins of the concaved opening 26 therein, the incline at which the lens is presented to the face of the grinding wheel determining the extent of the bevel and the swinging movement of the carriage upon the fulcrum 8 enabling said concaved opening to be ground in the arc of a circle concentric with said fulcrum.

Through the rotary movement of the shaft 15 the opposite margins or edges of the concave of the lens may be in succession presented to the face of the grinding wheel by making a one-half rotation of said shaft within the supporting sleeve 13. To provide for the rotation of said shaft, the upper end thereof which extends beyond said sleeve, is provided with an enlarged disk 27 having in its periphery diametrically opposed notches 28. By means of said disk the hollow shaft may be rotated in the sleeve to reverse the lens carried in the holder so as to present its opposite sides to the grinding wheel for the purpose of beveling from the opposite sides the margin of the concaved opening therein.

To lock the shaft so as to hold the lens in proper relation to the grinding wheel, the upper link 11 is provided with an arm 29 whose ends project in opposite directions at right angles to said link and whose upper end is adapted to engage in one of the notches in the disk 27, when the lens holder is in position to present the lens to the face of the grinding wheel, as shown in Figs. 1, 2 and 4. When withdrawing the lens from contact with the wheel by swinging the holding sleeve upwardly upon the links 10 and 11, the tilting of link 11 will carry the arm from the lower notch in the disk, as shown by dotted lines in Fig. 1, thereby releasing the rotary shaft and enabling it to be turned to reverse the lens, the shaft being again locked, as the holding sleeve is swung downwardly to again present the lens to the wheel, by the entrance of the upper end of the arm 29 into the opposite notch of the disk 27.

In order to prevent the lens holder from swinging downwardly too far against the grinding wheel, an adjusting screw 30 is employed which passes through the carriage 7 and engages the under face of a rotatable disk 31 secured to the lower end of the arm 29. Upon the under face of said disk, as shown in Fig. 5, are steps 32 in different planes which by the rotation of the disk, may be brought into alinement with the upper end of the adjusting screw 30, thereby regulating the downward movement of the lens holder toward the grinding wheel in accordance with the concave in the lens being ground. By means of this arrangement, it will now be seen that the concave in a bifocal lens may be beveled on opposite sides to allow of the fitting of another lens of different focus therein without changing the lens holder to the opposite side of the grinding wheel as has heretofore been necessary, the opposite bevels of the concave being readily ground by simply reversing the lens holder as before described.

Having thus fully set forth my invention, what I claim as new and desire to secure by Letters Patent is:—

1. In a bifocal lens grinder, the combination with a suitable grinding wheel, of a movable carriage, a lens holder mounted on the carriage and movable to present the lens to the grinder, means for reversing the holder to present both sides of the lens to the grinding wheel, and means for automatically locking the wheel as the carriage moves into the grinding position.

2. In a bifocal lens grinder, the combination with a grinding wheel, of a movably mounted carriage pivoted links supporting said carriage, a lens holder on said carriage positioned to present the lens at an acute angle to the wheel, and means for reversing said holder to present both sides of the lens for grinding.

3. In a bifocal lens grinder, the combination with a grinding wheel, of a carriage movable in the arc of a circle, a lens holder upon said carriage, said holder being movable toward and from the grinding wheel and rotatable to present both sides of the lens to said wheel and means for automatically locking the wheel as the carriage moves forward to present the lens to the grinding wheel.

4. In a bifocal lens grinder, the combination with a suitable grinding wheel, of a carriage movable in the arc of a circle, a spring-actuated lens holder mounted on said carriage to present the lens at a tangent to the periphery of the wheel, and means for reversing the holder to enable the grinding of a bevel on opposite sides of the lens.

5. In a bifocal lens grinder, the combination with the grinding wheel, of a carriage pivotally mounted in a plane tangent to the periphery of the wheel, a lens holder mounted on said carriage and movable independently thereof, means for retaining the lens in position while being ground, and means for presenting the lens to the stone to grind the opposite bevels thereon without changing the lens in the holder.

6. The combination with a grinding wheel, of a carriage movable in the arc of a circle adjacent said wheel, a lens holder upon the carriage movable toward and from the grinder, said lens holder being reversible to present the opposite sides of the lens for grinding, a spring-actuated plunger adapted to engage said lens and means for locking the lens holder during the operation of grinding.

In testimony whereof, I sign this specification in the presence of two witnesses.

JOHN E. GRAESSLE.

Witnesses:
E. L. RICE,
C. E. NORMAN.